(12) United States Patent  
Pasquini

(10) Patent No.: US 8,132,689 B2
(45) Date of Patent: Mar. 13, 2012

(54) COOKWARE HANDLE WITH A HOLLOW STRUCTURE

(75) Inventor: Ludovic Pasquini, Annecy (FR)

(73) Assignee: SEB S.A., Ecully (FR)

( * ) Notice: Subject to any disclaimer, the term of this patent is extended or adjusted under 35 U.S.C. 154(b) by 666 days.

(21) Appl. No.: 12/236,099

(22) Filed: Sep. 23, 2008

(65) Prior Publication Data

US 2009/0084803 A1 Apr. 2, 2009

(30) Foreign Application Priority Data

Sep. 27, 2007 (FR) ...................................... 07 06770

(51) Int. Cl.
*A47J 45/08* (2006.01)
(52) U.S. Cl. ..................... 220/755; 220/573.1; 220/912
(58) Field of Classification Search .................. 220/755, 220/753, 573.1, 912
See application file for complete search history.

(56) References Cited

U.S. PATENT DOCUMENTS

| | | | | |
|---|---|---|---|---|
| 979,847 A * | 12/1910 | Hammond | ..................... | 220/753 |
| 1,712,675 A * | 5/1929 | Olsen | ............................. | 220/753 |
| 1,965,354 A * | 7/1934 | Patock | ............................. | 16/421 |
| 2,231,222 A * | 2/1941 | Rosenheimer, Jr. | .......... | 220/755 |
| 2,431,808 A * | 12/1947 | Kluit | ............................. | 220/755 |
| 3,072,955 A | 1/1963 | Mitchell | | |
| 5,121,848 A * | 6/1992 | Waligorski | ..................... | 220/755 |
| 5,586,682 A * | 12/1996 | Yeh | ................................ | 220/755 |
| 5,867,867 A * | 2/1999 | Kessler | ........................... | 16/425 |
| 5,926,912 A | 7/1999 | Claphan | | |
| 6,170,694 B1 * | 1/2001 | Munari | ......................... | 220/753 |
| 6,367,125 B1 * | 4/2002 | Lin | .................................. | 16/436 |
| 6,725,505 B2 | 4/2004 | Willat | | |
| 7,490,732 B2 | 2/2009 | Wasserman et al. | | |
| 7,819,278 B2 * | 10/2010 | Ferron | ........................... | 220/755 |
| 2003/0218015 A1 * | 11/2003 | Randolph et al. | .......... | 220/212.5 |
| 2004/0060936 A1 * | 4/2004 | Logiudice | .................. | 220/254.1 |
| 2005/0098567 A1 * | 5/2005 | Randolph | ................... | 220/710.5 |
| 2005/0189360 A1 * | 9/2005 | Loucks et al. | ................. | 220/676 |
| 2006/0213033 A1 * | 9/2006 | Wasserman et al. | ............ | 16/421 |
| 2006/0237470 A1 * | 10/2006 | Zanner et al. | .................. | 220/752 |
| 2007/0017066 A1 * | 1/2007 | Chen et al. | ....................... | 16/421 |
| 2008/0290104 A1 | 11/2008 | Ng et al. | | |

FOREIGN PATENT DOCUMENTS

DE 597085 5/1934
EP 1704804 A1 9/2006

* cited by examiner

*Primary Examiner* — Steven A. Reynolds
*Assistant Examiner* — King M Chu
(74) *Attorney, Agent, or Firm* — The Webb Law Firm

(57) ABSTRACT

A cookware handle designed to be grasped by a user's hand, consisting of a rigid structure attached to the cookware and a flexible grip surrounding the rigid structure. The rigid structure contains at least one hollow cavity positioned directly underneath the grip, facing the hand support area.

9 Claims, 2 Drawing Sheets

COOKWARE HANDLE WITH A HOLLOW STRUCTURE

BACKGROUND OF THE INVENTION

1. Field of the Invention

This invention pertains to a handle for cookware such as a saucepan or frying pan.

2. Description of Related Art

In prior art, and specifically in document EP 1704804, we have seen a handle with a rigid structure and a grip surrounding the structure. The grip is made of a material that conducts heat less than the material of which the structure is made and has an ergonomic shape that makes the handle easy to hold. However, this construction does not make it possible to compress the grip so that its shape conforms to the shape of the user's hand when the handle is grasped and manipulated.

The objective of this invention is to offer a solution for the aforementioned disadvantages and to provide a cookware handle with optimal ergonomics, in which the shape of the grip conforms to the shape of the user's hand.

Another objective of the invention is to provide a cookware handle that makes it possible to manipulate said cookware in a completely safe manner by limiting the temperature of the grip and by ensuring that the handle will be held securely in the user's hand.

Another objective of the invention is to provide a cookware handle with a simple design that is inexpensive to implement.

SUMMARY OF THE INVENTION

All of these objectives are met by a cookware handle consisting of a rigid structure attached to the cookware and a flexible grip that surrounds the rigid structure, that is designed to be grasped by a user's hand due to the fact that the rigid structure has at least one hollow cavity positioned directly underneath the grip, facing a hand support area.

The term "hand support area" refers to the area of the handle on which the hand exerts pressure, including the thumb, palm and fingers.

In this invention, when the handle is grasped by the user's hand, the grip is compressed into the cavity. This compression causes the shape of the handle to conform to the shape of the hand, which improves the user's grasp on the handle.

The shaft of the rigid structure is preferably shaped like a tube.

This feature gives the handle its ergonomic shape and makes the structure simple and inexpensive to implement.

Another advantage of this feature is that when cooking food in the cookware, it dissipates the heat conducted to the grip by the structure toward the center of this hollow structure, thus limiting the temperature of the handle and improving the user's safety and comfort.

The grip is advantageously manufactured by an injection molding process and is glued onto the shaft of the rigid structure.

This feature makes the grip flexible and enables it to be attached to the rigid structure through simple manufacturing processes at a low production cost.

The shaft of the rigid structure preferably has an upper front part that contains the cavity.

This feature creates a compressible area facing the thumb support when the handle is grasped by the user's hand.

This feature also provides a thumb support area for which the temperature remains very low, since heat is conducted by the structure only to the periphery of the cavity.

Another advantage is that the shaft of the rigid structure has a lower part in which two elongated cavities are positioned along a longitudinal axis of the handle on either side of a strip of the material of which said shaft is made.

This feature creates two compressible areas located facing the end of the palm of the hand and the first and even the second phalanges of the fingers.

Preferably, the shaft of the structure has a lower front part consisting of a rigid area opposite the cavity existing in its upper front part.

This feature ensures that the handle will be held securely by pressing the index finger against a rigid area facing the compressible area where the thumb presses.

Another advantage is that the cavity in the upper front part of the shaft of the rigid structure is of an oblong shape.

This feature allows the shape of the compressible area to conform as closely as possible to the shape of the thumb when it presses in.

Another advantage is that the grip is made of a heat-resistant silicone material.

This feature stops the heat from migrating to the outer surface of the grip, which keeps the temperature of the grip low and comfortable for the user. Other materials such as elastomers or foam could also be considered.

Preferably, the grip has a wall that is between 1 and 8 millimeters thick and preferably 2 millimeters thick.

Another advantage is that the Shore hardness of the grip is between 30 and 50 shores, and preferably 40 shores.

This feature makes the grip flexible and soft to the touch, thus making it very comfortable to use.

These features allow the wall of the grip to be compressed anywhere from 2 to 8 millimeters, which makes the shape of the handle conform well to the shape of the hand.

BRIEF DESCRIPTION OF THE DRAWINGS

The invention will be more clearly described in reference to one specific example of implementation that in no way limits the scope of the invention, illustrated in the figures in the appendix, in which.

DETAILED DESCRIPTION OF THE INVENTION

Figure 1:
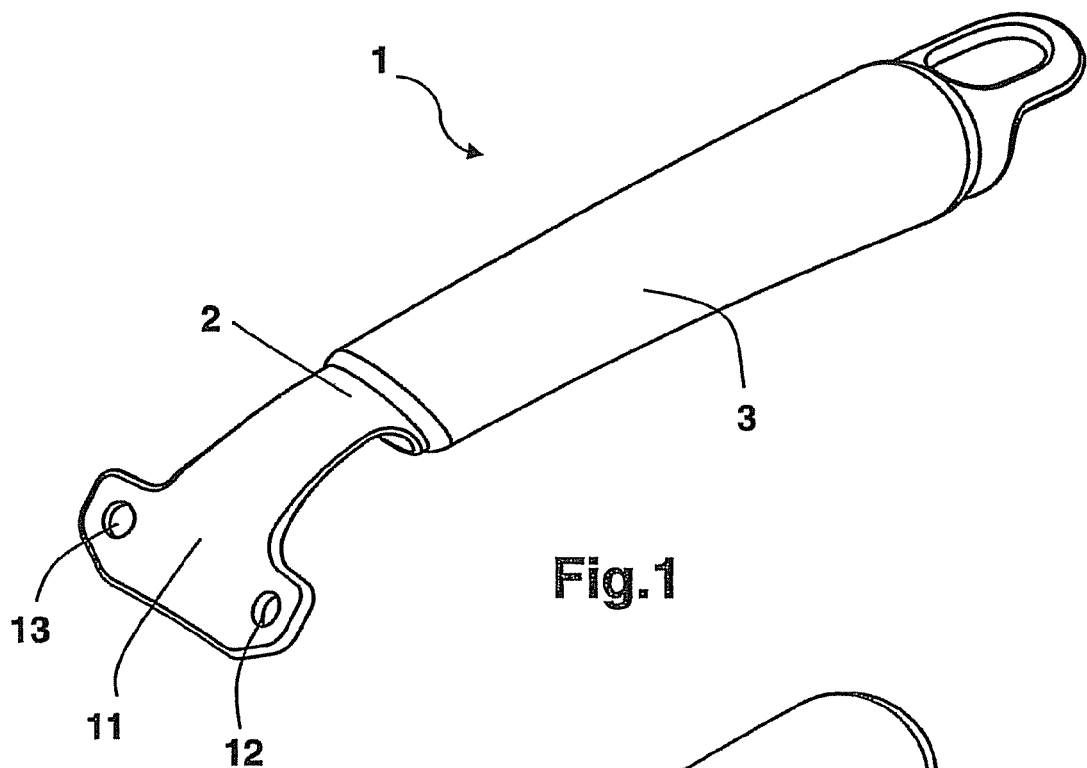
FIG. 1 depicts a perspective view of a cookware handle according to one specific presently preferred embodiment of the invention.
Figure 2:
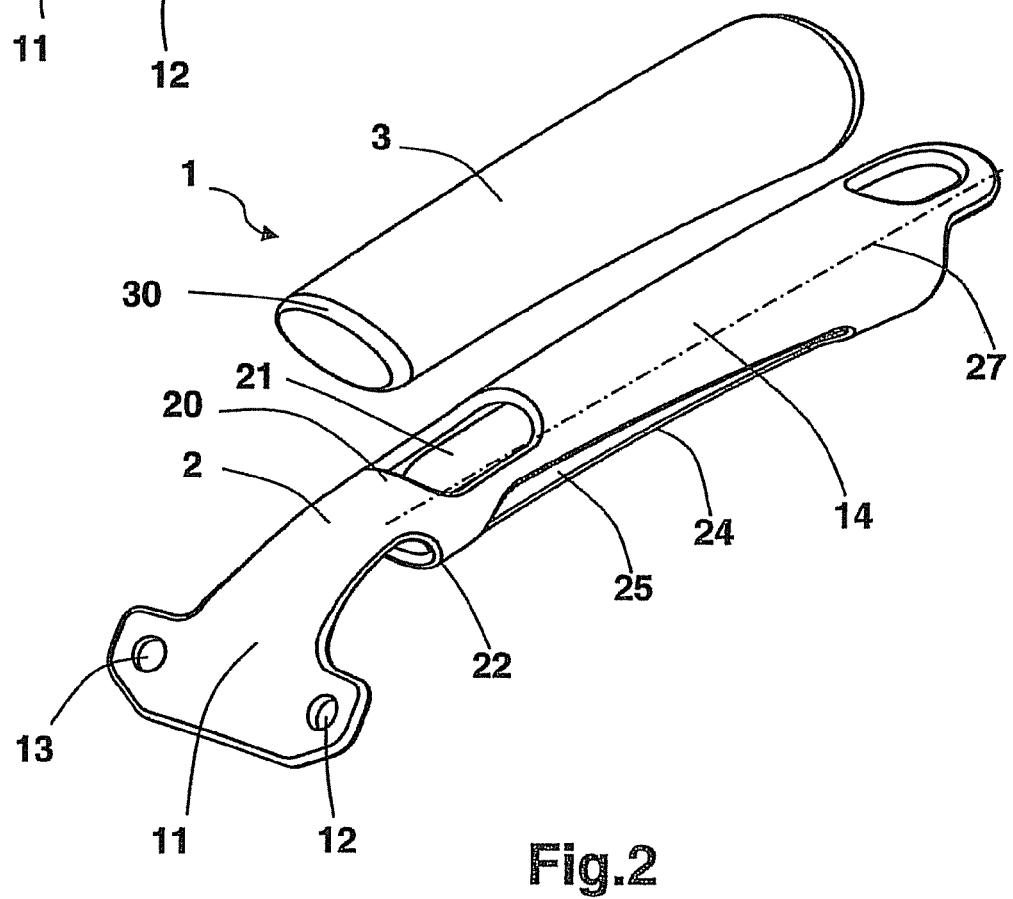
FIG. 2 is an exploded perspective view of the handle in FIG. 1.
Figure 3:
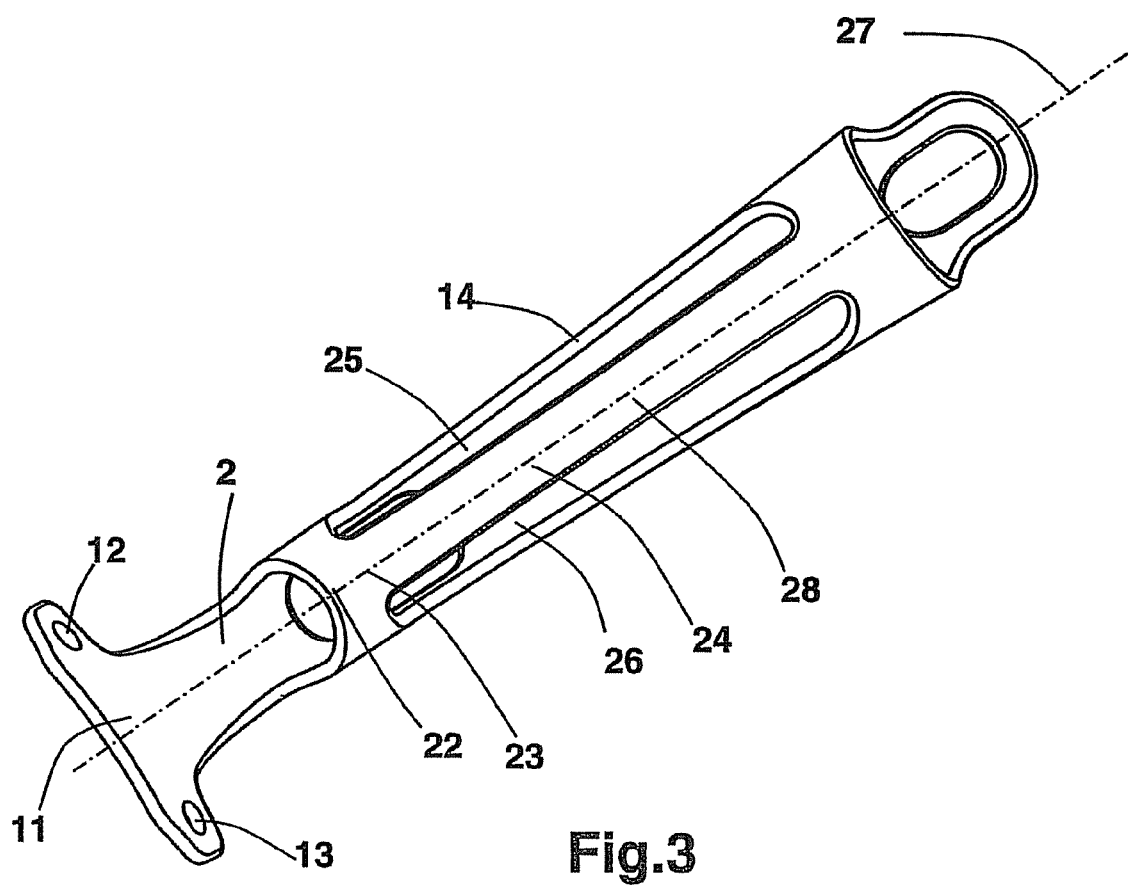
FIG. 3 is a perspective view from below the rigid structure of the handle shown in FIG. 1.

As shown in FIGS. 1 to 3, the cookware handle 1 consists of a rigid structure 2 and a grip 3 that surrounds the rigid structure 2.

The rigid structure 2 consists of a front part 11 that is designed to fit against the curved edge of the cookware. The front part 11 has a means of being attached to the curved edge, such as two holes 12, 13 that can accommodate two rivets.

From the front part 11, there is a rigid structure 2 consisting of a shaft 14 that is roughly tubular in shape, extending lengthwise, with an opening at each end.

The grip 3 is also tubular in shape and has a wall 30 of a roughly constant thickness. The grip 3 is made by injection molding and is attached to the rigid structure 2 by sliding it around the shaft 14 of the rigid structure 2. The grip 3 is held in place on the shaft 14 by glue. The grip 3 is made of a flexible silicone material.

The shaft 14 consists of an upper front part 20 containing a hollow cavity 21 positioned lengthwise, directly underneath the wall 30 of the grip 3, facing the area where the thumb of the hand presses in when the handle 1 is grasped. The cavity 21 is of an oblong shape approximately the shape of the thumb contacting the handle 1.

The shaft 14 of the rigid structure 2 has a lower front part 22 with a rigid area 23 opposite the cavity 21 located in its upper front part 20 (FIG. 2 and FIG. 3).

The shaft 14 of the rigid structure 2 has a lower part 24 containing two cavities 25, 26 of an elongated shape, positioned along a longitudinal axis 27 of the handle 1, on either side of a strip of rigid material 28 formed in the shaft 14 (FIG. 3).

In practice, when the handle 1 is grasped and manipulated, the wall of the grip 3 can be compressed into the cavities 21, 25 and 26 by up to ten millimeters under pressure from the various parts of the hand.

Of course, the scope of the invention is in no way limited to the method of implementation described and illustrated, which was provided simply as an example. Modifications are possible, particularly with regard to the makeup of the various components or substitution of technical equivalents, while still remaining within the scope of the invention.

The invention claimed is:

1. A cookware handle designed to be grasped by a user's hand, consisting of a rigid structure adapted to be attached to an item of cookware and a flexible grip surrounding the rigid structure, characterized in that the rigid structure contains a tube-shaped shaft, wherein the shaft has an upper front part containing a cavity and a lower web part containing two cavities of an elongated shape, positioned along a longitudinal axis of the handle, on either side of a strip of rigid material forming the web part, wherein at least one cavity is positioned directly underneath the grip, facing a hand support area to allow the grip to be compressed into the cavity when the cookware handle is grasped by the user's hand.

2. The cookware handle described in claim 1, characterized in that the grip is produced by injection molding and is glued onto the shaft of the rigid structure.

3. The cookware handle described in claim 1, characterized in that the shaft of the structure has a lower front part consisting of a rigid area opposite the cavity located in its upper front part.

4. The cookware handle described in claim 1, characterized in that the cavity in the upper front part of the shaft of the rigid structure is of an oblong shape.

5. The cookware handle described in claim 1, characterized in that the grip is made of a heat-resistant silicone material.

6. The cookware handle described in claim 1, characterized in that the grip has a wall that is between 1 and 8 millimeters thick.

7. The cookware handle of claim 6 wherein the wall is about 2 millimeters thick.

8. The cookware handle described in claim 1, characterized in that the Shore hardness of the grip is between 30 and 50.

9. The cookware handle of claim 8, wherein the Shore hardness of the grip is about 40.

\* \* \* \* \*